(12) United States Patent
Bostian et al.

(10) Patent No.: US 10,579,347 B2
(45) Date of Patent: Mar. 3, 2020

(54) SELF RE-ENCODING INTERPRETED APPLICATION

(71) Applicant: INTERNATIONAL BUSINESS MACHINES CORPORATION, Armonk, NY (US)

(72) Inventors: Joseph A. Bostian, Red Hook, NY (US); Nicholas Marion, Poughkeepsie, NY (US); Dow Moran, Poughkeepsie, NY (US); David Rice, Nassau, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 71 days.

(21) Appl. No.: 15/803,055

(22) Filed: Nov. 3, 2017

(65) Prior Publication Data

US 2019/0138284 A1    May 9, 2019

(51) Int. Cl.
  *G06F 8/41* (2018.01)
  *G06F 9/445* (2018.01)
  *G06F 8/36* (2018.01)
  *G06F 8/76* (2018.01)

(52) U.S. Cl.
  CPC ............... *G06F 8/423* (2013.01); *G06F 8/36* (2013.01); *G06F 9/44521* (2013.01); *G06F 9/44547* (2013.01); *G06F 8/76* (2013.01); *G06F 2201/86* (2013.01); *G06F 2201/865* (2013.01)

(58) Field of Classification Search
  CPC .................................. G06F 8/423; G06F 8/36
  USPC .......................................................... 717/106
  See application file for complete search history.

(56) References Cited

U.S. PATENT DOCUMENTS

| | | | | |
|---|---|---|---|---|
| 5,812,843 A | * | 9/1998 | Yamazaki | G06F 9/45537 709/201 |
| 5,822,526 A | * | 10/1998 | Waskiewicz | H04L 61/307 709/206 |
| 6,314,469 B1 | * | 11/2001 | Tan | H04L 61/1511 709/245 |
| 6,691,125 B1 | * | 2/2004 | Engle | G06F 16/10 |

(Continued)

FOREIGN PATENT DOCUMENTS

WO    2013191852 A1    12/2013

*Primary Examiner* — Lewis A Bullock, Jr.
*Assistant Examiner* — Theodore E Hebert
(74) *Attorney, Agent, or Firm* — Cantor Colburn LLP; William Kinnaman (57) ABSTRACT

A method for self re-encoding an interpreted application includes parsing a string of characters in a comment section of the interpreted application file. Responsive to determining that at least one character of the string of characters is not readable by the target platform, the processor re-encodes the interpreted application file using the string of characters in the comment section. The re-encoding includes parsing a first character in the string of characters. The processor then, optionally, outputs a warning message indicative that a non-native encoding exists in the interpreted application file. The processor parses a second character sequential to the first character. The second character is a first element in a second string of characters indicative of a re-encoding scheme for re-encoding the interpreted application. The processor then outputs a re-encoded application file that is executable by the processor of the target platform.

14 Claims, 6 Drawing Sheets

(56) References Cited

U.S. PATENT DOCUMENTS

| | | | |
|---|---|---|---|
| 8,146,057 B1* | 3/2012 | Michelsen | G06F 11/3672 |
| | | | 717/124 |
| 8,429,623 B2 | 4/2013 | Russell et al. | |
| 8,776,097 B2* | 7/2014 | Kinkade | G06F 9/44547 |
| | | | 719/331 |
| 9,152,796 B2* | 10/2015 | Gluck | G06F 21/577 |
| 9,513,978 B2* | 12/2016 | Clissold | G06F 9/541 |
| 9,606,794 B1 | 3/2017 | Chou et al. | |
| 2002/0052902 A1* | 5/2002 | Bauer | G06F 17/2217 |
| | | | 715/256 |
| 2002/0186660 A1* | 12/2002 | Bahadiroglu | H04L 29/06 |
| | | | 370/248 |
| 2003/0033334 A1* | 2/2003 | Banerjee | H04L 67/02 |
| | | | 715/256 |
| 2003/0182103 A1* | 9/2003 | Atkin | G06F 17/214 |
| | | | 704/9 |
| 2009/0282089 A1* | 11/2009 | Lakshmanachar | G06F 16/10 |
| 2010/0107178 A1* | 4/2010 | Foster | H04L 67/2809 |
| | | | 719/316 |
| 2012/0117545 A1* | 5/2012 | Yokoi | G06F 11/3624 |
| | | | 717/126 |
| 2014/0035764 A1* | 2/2014 | Clissold | H03M 7/02 |
| | | | 341/50 |
| 2014/0101105 A1* | 4/2014 | Lee | G06F 16/254 |
| | | | 707/635 |
| 2015/0138003 A1* | 5/2015 | Liu | H03M 7/00 |
| | | | 341/51 |
| 2015/0234642 A1 | 8/2015 | Araya et al. | |
| 2017/0052780 A1* | 2/2017 | Clevenger | G06F 8/76 |

* cited by examiner

SELF RE-ENCODING INTERPRETED APPLICATION

BACKGROUND

The present invention relates to application file encoding, and more specifically, to self re-encoding of an interpreted application.

Software developers often export a file for use in developing a sub-system from one computing platform which may be in American Standard Code for Information Interchange (ASCII) encoding or Unicode encoding (e.g., as used in operating systems such as Windows, Linux, etc.) to another target computing platform that uses another encoding. An example of an encoding for a target computing platform may be, for example, an Extended Binary Coded Decimal Interchange Code (EBCDIC) encoding scheme. To perform the translation step conventionally, the developer must manually transfer the file with the non-native encoding to the target system, and the developer re-encodes the application file using an existing re-encoding tool. The developer must then remember specific translation steps for re-encoding that are specific to the target platform, and if the developer is in the position to perform the translation twice, errors can ensue and the file may be corrupted.

Conventional systems are not able to, without additional changes to the interpreter and without an additional re-encoding tool, execute the interpreted application on a target platform with same encoding as the application file code, and also execute the same interpreted program on another platform with encoding different from the encoding of the interpreted application. Moreover, no conventional system automatically re-encodes an interpreted application to both native and non-native encoding target platforms without interaction with or additional steps performed by a user (i.e., a developer), without regard to whether the developer knows the target platform encoding scheme.

SUMMARY

Embodiments of the present invention are directed to a method for re-encoding an interpreted application file. The method includes parsing, via a target platform processor, a string of characters in a comment section of the interpreted application file. Responsive to determining that at least one character of the string of characters is not readable by the target platform, the processor re-encodes the interpreted application file using the string of characters in the comment section. The re-encoding includes parsing, via the processor, a first character in the string of characters. The processor then, optionally, outputs a warning message indicative that a non-native encoding exists in the interpreted application file. The processor next parses a second character sequential to the first character. The second character is a first element in a second string of characters indicative of a re-encoding scheme for re-encoding the interpreted application. The processor then outputs a re-encoded application file that is executable by the processor of the target platform. The output is based on the interpreted application file, where the processor re-encodes the application file using the second string.

According to other embodiments of the present invention, a system for re-encoding an interpreted application file for execution by a target platform includes a processor configured to parse a string of characters in a comment section of the interpreted application file. Responsive to determining that at least one character of the string of characters is not readable by the target platform, the processor re-encodes the interpreted application file using the string of characters in the comment section, the processor configured to parse a first character in the string of characters, and optionally output a warning message indicative that a non-native encoding exists in the interpreted application file. The processor then parses a second character sequential to the first character. The second character is a first element in a second string of characters indicative of a re-encoding scheme for re-encoding the interpreted application. The processor then outputs a re-encoded application file that is executable by the processor of the target platform. The output is based on the interpreted application file, where the processor re-encodes the application file using the second string.

According to other embodiments of the present invention, a computer-readable storage medium for re-encoding an interpreted application file includes program instructions embodied therewith. The program instructions are executable by a processor to cause the processor to perform a method. The method includes parsing, via a target platform processor, a string of characters in a comment section of the interpreted application file. Responsive to determining that at least one character of the string of characters is not readable by the target platform, the processor re-encodes the interpreted application file using the string of characters in the comment section. The re-encoding includes parsing, via the processor, a first character in the string of characters. The processor then, optionally, outputs a warning message indicative that a non-native encoding exists in the interpreted application file. The processor next parses a second character sequential to the first character. The second character is a first element in a second string of characters indicative of a re-encoding scheme for re-encoding the interpreted application. The processor then outputs a re-encoded application file that is executable by the processor of the target platform. The output is based on the interpreted application file, where the processor re-encodes the application file using the second string.

DETAILED DESCRIPTION

Figure 1:
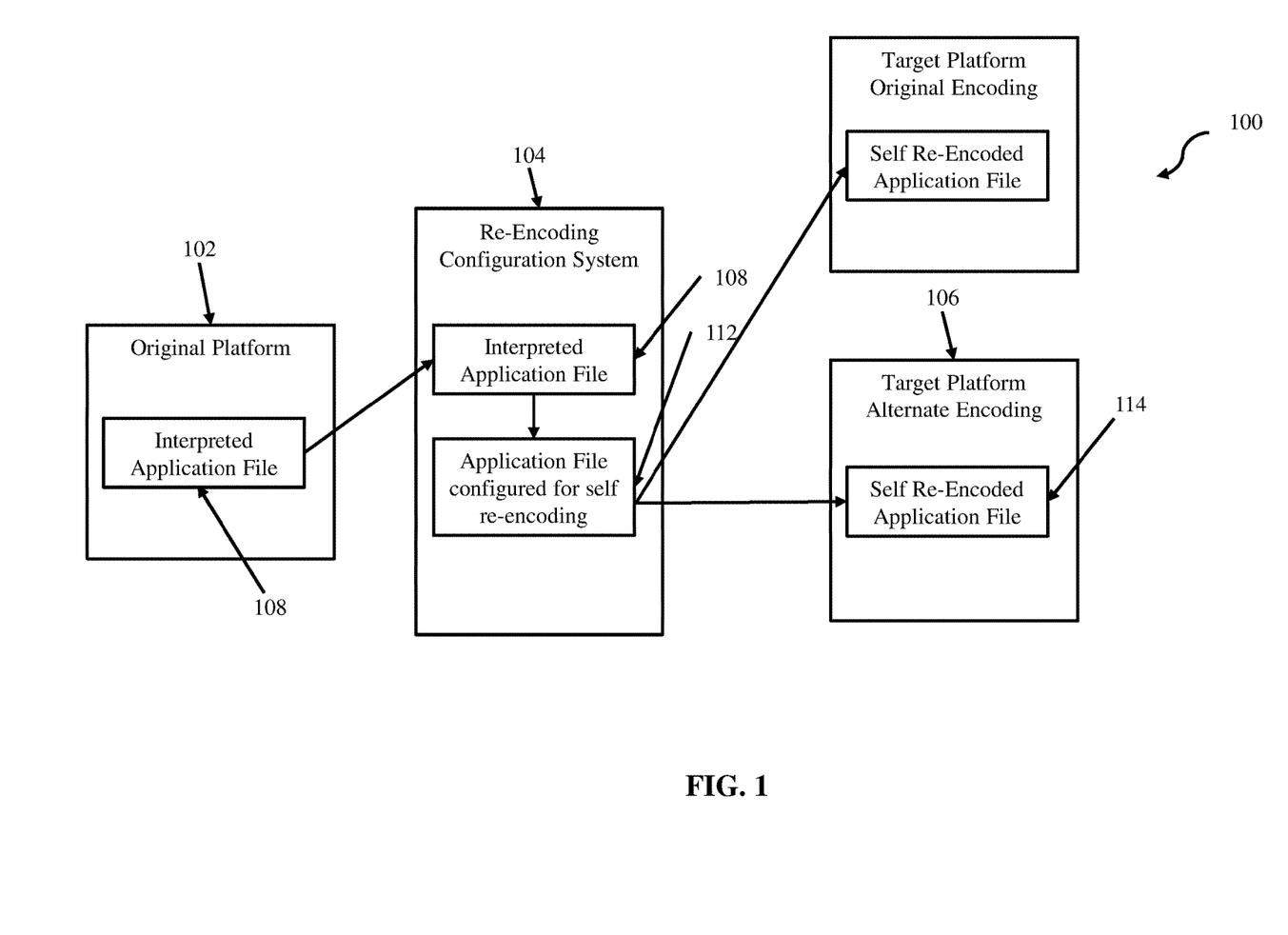
FIG. 1 depicts a system for self re-encoding according to an exemplary embodiment.

FIG. 1 depicts a system 100 for self re-encoding, according to an exemplary embodiment. A developer in the computing environment depicted in FIG. 1 may desire take an application file (e.g., interpreted application file 108) that is encoded to be read by the original platform 102, and re-encode it to be run by another platform dissimilar to the original platform. For example, as shown in FIG. 1, a target platform 106 may run an operating system that understands native ASCII encoding. If the developer wants to re-encode an interpreted application file 108 (hereafter application file 108), using a conventional system the developer may have had to perform multiple manual re-encoding steps using existing re-encoding utilities. For example, In Unix-like operating systems, internationalization conversion (iconv) is a command-line program and a standardized application programming interface (API) used to convert between different character encodings. Iconv is an example of a manual tool commonly used by developers to convert from any of these encodings to any other, through Unicode conversion. To perform the translation step conventionally, the developer must manually transfer the file with the non-native encoding to the target system, and the developer must re-encode the application file. The developer must then remember specific translation steps using the specific tool for re-encoding that may be specific to the target platform. If the developer is required to perform the translation twice, errors can ensue and the file may be corrupted if the exact settings, steps, etc. are not precisely replicated. Moreover, the developer must also know in advance what encoding system the target system employs.

Accordingly, it is advantageous to provide a system (as depicted in FIG. 1) that can reconfigure (edit) a single file from the original platform 102 with ASCII coding embedded in the comment section of the interpreted application file 108. In some aspects, it advantageous for the system 100 to configure the file 108 such that it can be imported into the target platform 106 without knowing what encoding is necessary for the target platform. In some aspects, it is advantageous to provide automatic self re-encoding, via a processor in the re-encoding system 104, using information in the comment section of the configured file 112, where no scripts or changes to existing interpreter in the target platform 106 would be needed to re-encode the application file 112.

In one aspect, instructions for the self re-encoding may be embedded in the comment section of the interpreted application file 108. In some programming languages, it is contextually permissible to include coding hints in the comment section of the file. One issue arises, however, when the comment section includes code that is unreadable by the target platform. Although humans can distinguish characters that should be ignored and identify only relevant information, operating systems are deterministic in that they will fail if it cannot read what is presented for encoding, even if it is in the comment section (that is normally ignored by the operating system). According to the embodiment depicted in FIG. 1, a developer may import application file 108 into a re-encoding system 104 to reconfigure the file for automatic self re-encoding using information in ASCII format that is embedded in the comment section of the configured file 112. In one aspect, the system 104 reconfigures the application file 108 such that it includes a comment section that, when read by a target platform 106, ignores all characters in the comment section that are unreadable by the target system, except a special character string in ASCII encoding that is readable by the target platform 106.

In some aspects, the reconfigured application file 112 includes instructions in ASCII format indicative of a re-encoding scheme for re-encoding the interpreted application file 112. According to one embodiment, the target platform 106 may then parse the comment section of the application file 112, ignoring any characters that would normally cause a translation error if they were in the mainline code of the interpreted application file. The comment section will inform the target platform 106 of the native (or original) encoding scheme of the application file 112, and include instructions for self re-encoding the file. The target platform 106 re-encodes the file and outputs a self re-encoded application file 114 without any changes to the mainline code of the application file 112, and without any interaction with a user (e.g., a software developer) or changes to the translation mechanism in the operating system of the target platform.

Figure 2:
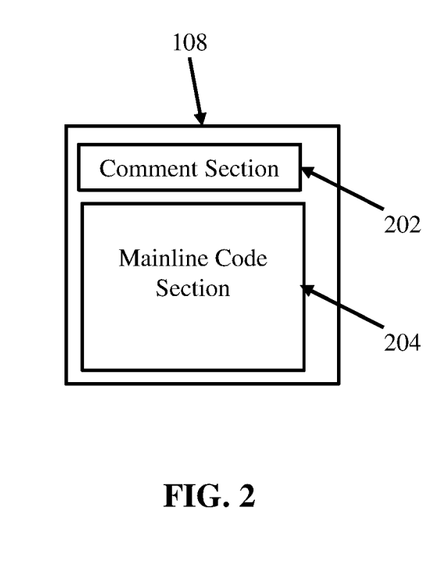
FIG. 2 depicts an interpreted application file according to an exemplary embodiment.

FIG. 2 depicts the interpreted application file 108, according to an exemplary embodiment. Interpreted application file 108 includes a comment section 202, and a mainline code section 204.

Figure 3:
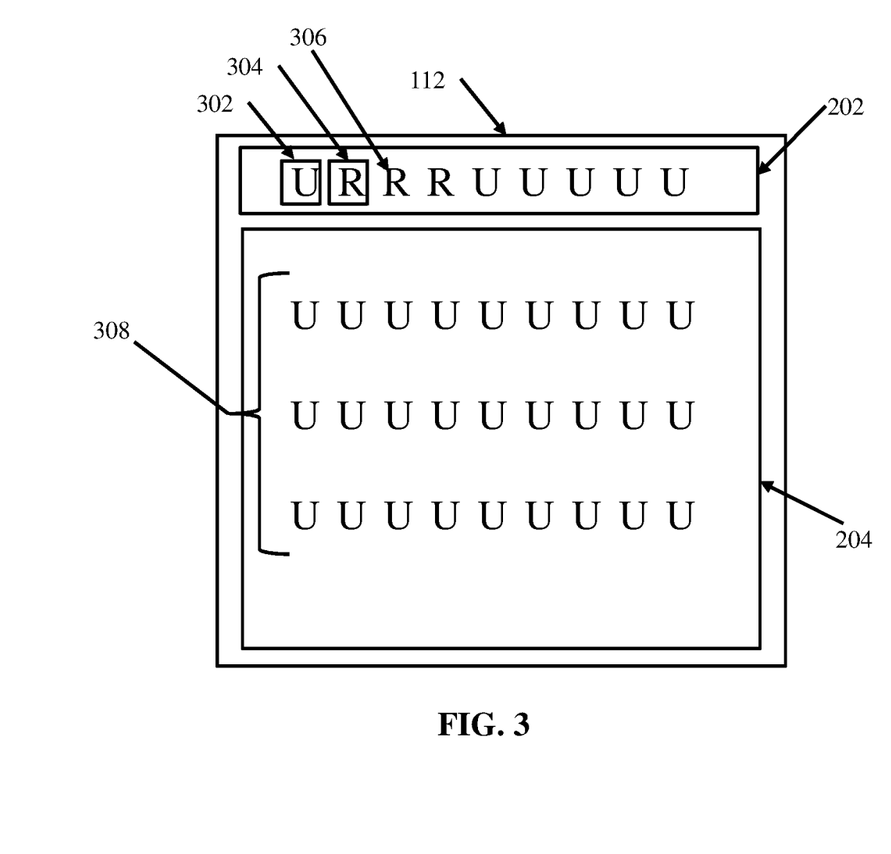
FIG. 3 depicts an interpreted application file configured for self re-encoding according to an exemplary embodiment.
Figure 6:
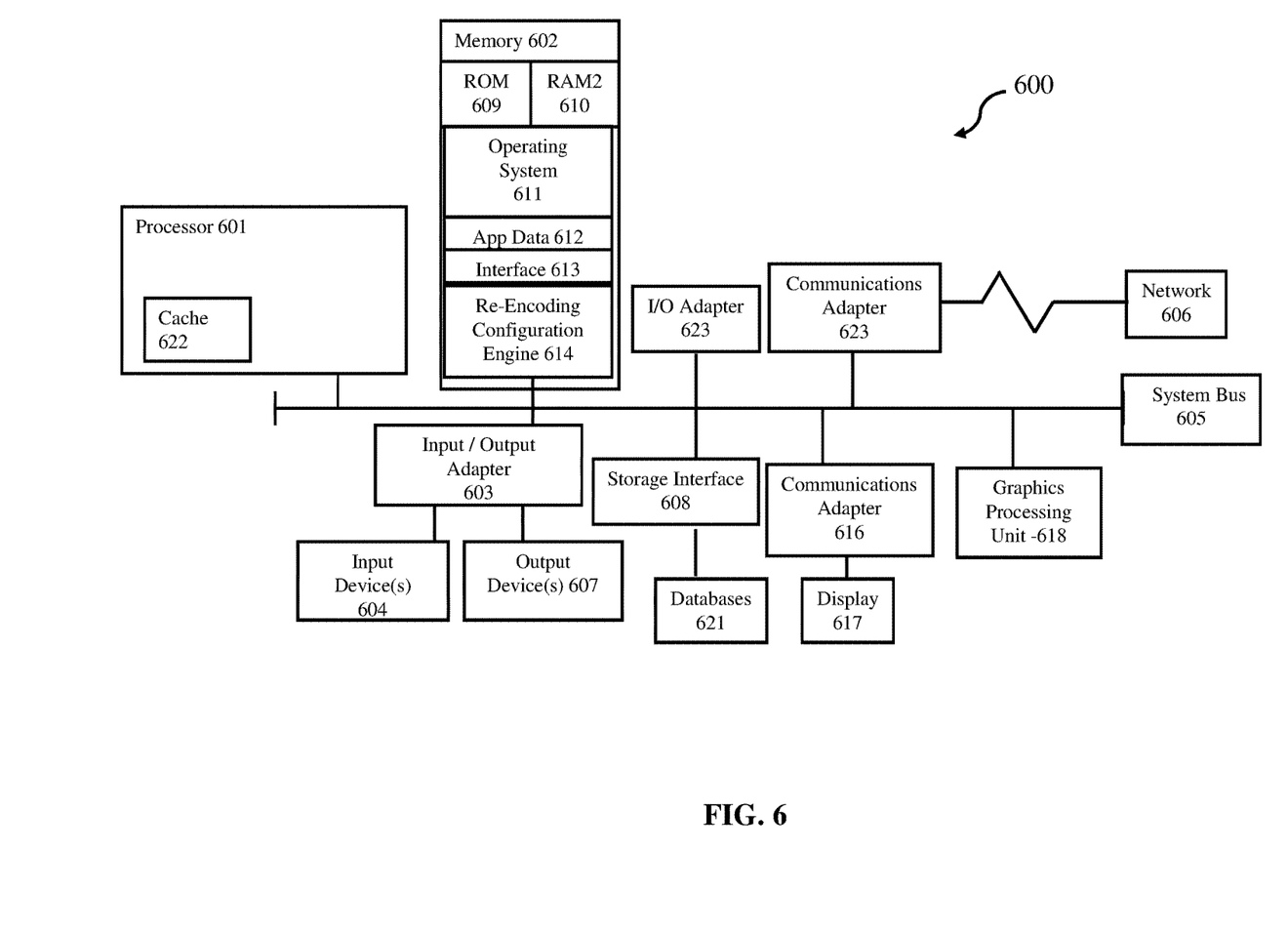
FIG. 6 depicts an exemplary computing system for performing one or more embodiments described herein.

FIG. 3 is another example of the interpreted application file 112 configured for self re-encoding, according to an exemplary embodiment. The application file 112 (after configuration for automatic self re-encoding) includes a comment section 202 and a mainline code section 204. In one aspect, a system processor associated with the target platform 106 (e.g., processor 601, as depicted in FIG. 6) may parse a string of characters (e.g., characters 302, 304, etc.) in the comment section 202 of the interpreted application file 112. As shown in FIG. 3, characters may be readable (shown in FIG. 3 as R) or unreadable (shown in FIG. 3 as U). In conventional systems, if the processor 601 encounters an unreadable character (unreadable because it is encoded for a dissimilar and encoding scheme from the target platform) such as character 302, the translation application would normally experience an error that interrupts or ends execution of the program. Even if the following character 304 were readable, conventional re-encoding systems would not get to the second character because the initial unreadable character stops the process. According to one embodiment, the processor 601 parses the string of characters 302, 304, 306, etc., in the comment section 202 of the interpreted application file 112. The processor is configured to determine whether at least one character 302 of the string of characters is not readable by the target platform processor. The mainline code 308 is also not readable. Instead of ending the program or outputting an error message, the processor reads the second character 304. The comment section 202 includes a second string of char (that includes characters 304, 306, et seq.) in the ASCII encoding. The next sequential character 304 is sequential to the first character 302, where the second character 304 is a first element indicative of a re-encoding scheme for re-encoding the interpreted application file 112. In some aspects, the processor 601 re-encodes the application file 112, and outputs a re-encoded application file (114, shown with respect to FIG. 1). The re-encoded application file is executable by the processor 601 of the target platform 106, because the file is now re-encoded for native execution by the target platform. The target platform 106 outputs file 114 based on the interpreted application file 112, where the processor re-encodes the application file using the second string (304, 306, etc.).

Figure 4:
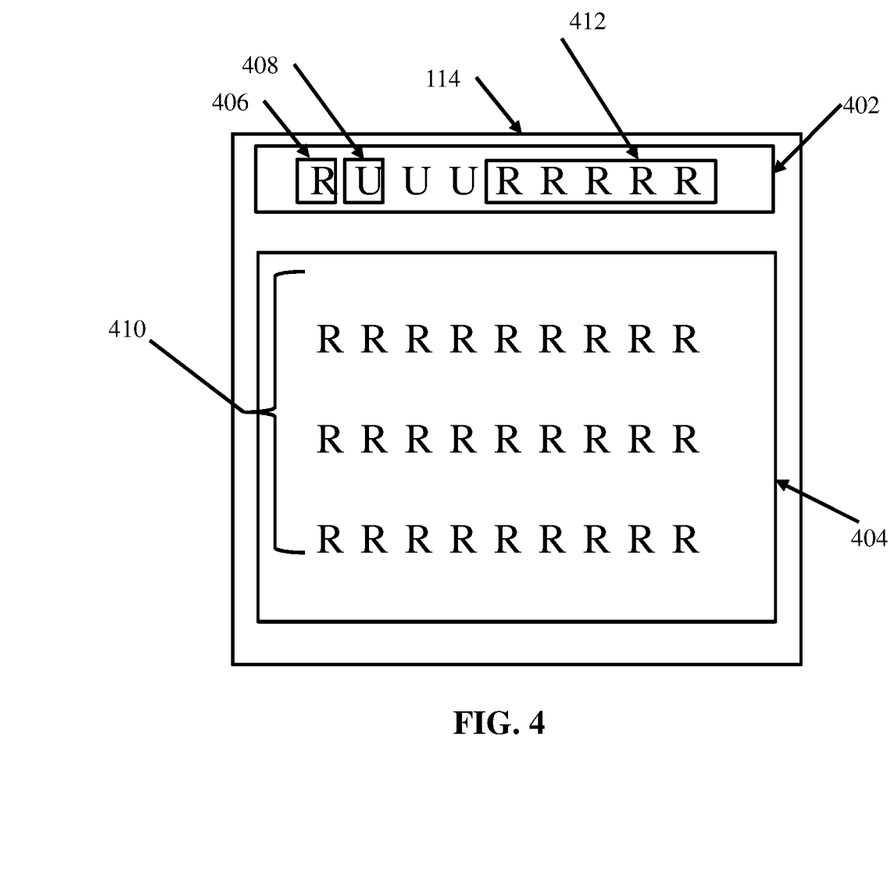
FIG. 4 depicts a self re-encoded interpreted application file according to an exemplary embodiment.

FIG. 4 depicts a self re-encoded interpreted application file according to an exemplary embodiment. Like the configured application file 112, file 114 includes a comment section 402 and a mainline code section 404. After self re-encoding, the re-encoded file 114 will include a readable character 406, but the second character and sequential characters (e.g., the second string) 408 are now unreadable by the target platform 106 after the self re-encoding. Although mainline code 410 is now readable by the target platform 106, the mainline code is not changed during the self re-encoding process. After self re-encoding all mainline characters are readable. If additional comments exist they will now be readable as well 412.

Figure 5:
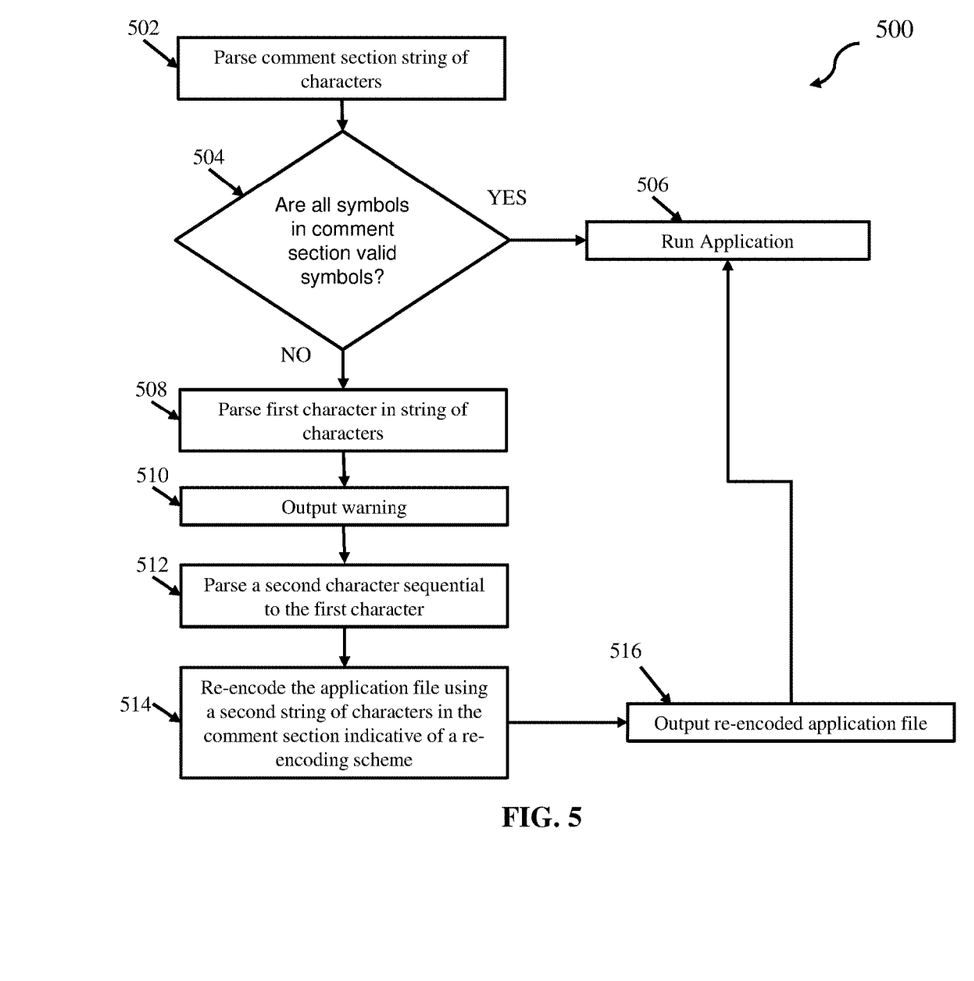
FIG. 5 depicts a method for self re-encoding an interpreted application file according to an embodiment.

FIG. 5 depicts a method 500 for self re-encoding the interpreted application file 112, according to an embodiment. As shown in block 502, the processor 601 parses a string of characters (e.g., characters 302, 304, 306, etc. as shown in FIG. 3) in a comment section 202 of the interpreted application file 112.

At decision block 504, the processor 601 determines whether all of the symbols in the comment section are valid. Valid characters are readable by the system because the encoding matches the encoding of the target platform 106. Accordingly, the processor 601 determines whether at least one character 302 of the string of characters 302-306, etc.) is not readable by the target platform 106. If all of the symbols are readable (and thus valid symbols with respect to the target platform), then the system re-encodes the application file using conventional methods, as shown in block 506. If all symbols are readable except for 302-306, etc., then the application should not be reencoded and run normally.

Referring again to decision block 504, responsive to determining that at least one character of the string of characters is not readable by the target platform, the processor 601 re-encodes the interpreted application file using the string of characters in the comment section 202. Particularly, the processor 601 uses a second string of readable characters (starting in FIG. 3 with character 304). The second string of characters includes instructions for self re-encoding of the application file 112.

Accordingly, at step 508, the processor 601 parses the first character 302 in the string of characters (302, 304, etc.).

At block 510, the processor 601 then may output a warning indicating that an unreadable character was encountered. In one aspect, the processor 601 outputs the warning to a null device (thus making masking the output of the warning). Accordingly, from the perspective of a developer, the warning is not seen and the process continues as though no warning were output by the processor.

At block 512, the processor 601 parses a second character 304 sequential to the first character 302. The second character 304 is a first element in a second string of characters (characters 304, 306, etc.) indicative of a re-encoding scheme for re-encoding the interpreted application. The re-encoding scheme instructions may include one or more re-encoding instructions for self re-encoding the application file. For example, the target platform may require an Extended Binary Coded Decimal Interchange Code (EBCDIC) encoding scheme. Accordingly, as shown in block 514, the processor 601 re-encodes the application file 112 using the second string of characters (304-306, etc.). These characters can invoke an existing system utility such as iconv to convert the file itself. Alternatively, the characters could contain the source code of a utility to do the conversion such as including the source of iconv.

At block 516, the processor 601 outputs a re-encoded application file 114 that is executable by the target platform 106. The re-encoded application file 114 is readable with native encoding that matches the target platform 106.

FIG. 6 illustrates a block diagram of an exemplary computing environment and computer system 600 for use in practicing the embodiments described herein. The environment and system described herein can be implemented in hardware, software (e.g., firmware), or a combination thereof. In an exemplary embodiment, a hardware implementation can include a microprocessor or a special or general-purpose digital computer, such as a personal computer, workstation, minicomputer, or mainframe computer. Computer 600, therefore, can embody a general-purpose computer. In another exemplary embodiment, the implementation can be part of a mobile device, such as, for example, a mobile phone, a personal data assistant (PDA), a tablet computer, etc.

As shown in FIG. 6, the computer 600 includes processor 601. Computer 600 also includes memory 602 communicatively coupled to processor 601, and one or more input/output adapters 603 that can be communicatively coupled via system bus 605. Memory 602 can be communicatively coupled to one or more internal or external memory devices via a storage interface 608. Communications adapter 616 can communicatively connect computer 600 to one or more networks 606. System bus 605 can communicatively connect one or more user interfaces via input/output (I/O) adapter 603. I/O adapter 603 can connect a plurality of input devices 604 to computer 600. Input devices can include, for example, a keyboard, a mouse, a microphone, a sensor, etc. System bus 605 can also communicatively connect one or more output devices 607 via I/O adapter 603. Output device 607 can include, for example, a display, a speaker, a touchscreen, etc.

Processor 601 is a hardware device for executing program instructions (aka software), stored in a computer-readable memory (e.g., memory 602). Processor 601 can be any custom made or commercially available processor, a central processing unit (CPU), a plurality of CPUs, an auxiliary processor among several other processors associated with the computer 600, a semiconductor based microprocessor (in the form of a microchip or chip set), or generally any device for executing instructions. Processor 601 can include a cache memory 622, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 622 can be organized as a hierarchy of more cache levels (L1, L2, etc.).

Processor 601 can be disposed in communication with one or more memory devices (e.g., RAM 609, ROM 610, one or more external databases 621, etc.) via a storage interface 608. Storage interface 608 can also connect to one or more memory devices including, without limitation, one or more databases 621, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc. Variations of memory devices can be used for implementing, for example, list all databases from other figures.

Memory 602 can include random access memory (RAM) 609 and read only memory (ROM) 610. RAM 609 can be any one or combination of volatile memory elements (e.g., DRAM, SRAM, SDRAM, etc.). ROM 610 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 602 can incorporate electronic, magnetic, optical, and/or other types of non-transitory computer-readable storage media. Memory 602 can also be a distributed architecture, where various components are situated remote from one another, but can be accessed by processor 601.

The instructions in memory 602 can include one or more separate programs, each of which can include an ordered listing of computer-executable instructions for implementing logical functions. In the example of FIG. 6, the instructions in memory 602 can include an operating system 611. Operating system 611 can control the execution of other computer programs and provides scheduling, input-output control, file and data management, memory management, and communication control and related services.

The program instructions stored in memory 602 can further include application data 612, and for a user interface 613.

Memory 602 can also include program instructions for re-encoding configuration engine 614, configured to perform the configuration of the application file for self re-encoding.

I/O adapter 603 can be, for example but not limited to, one or more buses or other wired or wireless connections. I/O adapter 603 can have additional elements (which are omitted for simplicity) such as controllers, microprocessors, buffers (caches), drivers, repeaters, and receivers, which can work in concert to enable communications. Further, I/O adapter 603 can facilitate address, control, and/or data connections to enable appropriate communications among the aforementioned components.

I/O adapter 603 can further include a display adapter coupled to one or more displays. I/O adapter 603 can be configured to operatively connect one or more input/output (I/O) devices 607 to computer 600. For example, I/O 603 can connect a keyboard and mouse, a touchscreen, a speaker, a haptic output device, or other output device. Output devices 607 can include but are not limited to a printer, a scanner, and/or the like. Other output devices can also be included, although not shown. Finally, the I/O devices connectable to I/O adapter 603 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 600 can include a mobile communications adapter 623. Mobile communications adapter 623 can include GPS, cellular, mobile, and/or other communications protocols for wireless communication.

In some embodiments, computer 600 can further include communications adapter 616 for coupling to a network 606.

Network 606 can be an IP-based network for communication between computer 600 and any external device. Network 606 transmits and receives data between computer 600 and devices and/or systems external to computer 600. In an exemplary embodiment, network 606 can be a managed IP network administered by a service provider. Network 606 can be a network internal to an aircraft, such as, for example, an avionics network, etc. Network 606 can be implemented in a wireless fashion, e.g., using wireless protocols and technologies, such as WiFi, WiMax, etc. Network 606 can also be a wired network, e.g., an Ethernet network, an ARINC 429 network, a controller area network (CAN), etc., having any wired connectivity including, e.g., an RS232 connection, R5422 connection, etc. Network 606 can also be a packet-switched network such as a local area network, wide area network, metropolitan area network, Internet network, or other similar type of network environment. The network 606 can be a fixed wireless network, a wireless local area network (LAN), a wireless wide area network (WAN) a personal area network (PAN), a virtual private network (VPN), intranet or other suitable network system.

Network 606 can operatively connect computer 600 to one or more devices including device 617, device 618, and device 620. Network 606 can also connect computer 600 to one or more servers such as, for example, server 619.

If computer 600 is a PC, workstation, laptop, tablet computer and/or the like, the instructions in the memory 602 can further include a basic input output system (BIOS) (omitted for simplicity). The BIOS is a set of routines that initialize and test hardware at startup, start operating system 611, and support the transfer of data among the operatively connected hardware devices. The BIOS is typically stored in ROM 610 so that the BIOS can be executed when computer 600 is activated. When computer 600 is in operation, processor 601 can be configured to execute instructions stored within the memory 602, to communicate data to and from the memory 602, and to generally control operations of the computer 600 pursuant to the instructions.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for re-encoding an interpreted application file, comprising:
   parsing, via a processor, a string of characters in a comment section of the interpreted application file;
   responsive to determining that at least one character of the string of characters is not readable by a target platform, re-encoding, via the processor, the interpreted application file using the string of characters in the comment section, the re-encoding comprising:
      parsing, via the processor, a first character in the string of characters;
      outputting, via the processor, a warning message indicative that a non-native encoding exists in the interpreted application file;
      parsing, via the processor, a second character sequential to the first character, wherein the second character is a first element in a second string of characters indicative of a re-encoding scheme for re-encoding the interpreted application, wherein both the first string of characters and the second string are solely in the comment section of the application file and not in a mainline code section of the application file; and
      outputting, via the processor, a re-encoded application file that is executable by the target platform, the outputting based on the interpreted application file, wherein the processor re-encodes the application file using the second string, wherein outputting the warning message comprises outputting the warning message to an empty device such that the warning message is suppressed and not visible to a user.

2. The method of claim 1, wherein the string of characters in the comment section of the interpreted application file comprises one or more of an American Standard Code for Information Interchange (ASCII) encoding scheme and a Unicode encoding scheme.

3. The method of claim 1, wherein re-encoded application file comprises a mainline code section re-encoded to an Extended Binary Coded Decimal Interchange Code (EBCDIC) encoding scheme.

4. The method of claim 1, wherein the second string of characters comprises instructions for re-encoding that, when executed by a second processor running a second platform operating system dissimilar to the target platform, are ignored by the second platform operating system.

5. The method of claim 1, wherein the outputting the warning message indicative that the non-native encoding exists in the interpreted application file is optionally output.

6. A system for re-encoding an interpreted application file for execution by a target platform, the system comprising a processor configured to:
  parse a string of characters in a comment section of the interpreted application file;
  responsive to determining that at least one character of the string of characters is not readable by the target platform, re-encode the interpreted application file using the string of characters in the comment section, the processor configured to:
    parse a first character in the string of characters;
    output a warning message indicative that a non-native encoding exists in the interpreted application file;
    parse a second character sequential to the first character, wherein the second character is a first element in a second string of characters indicative of a re-encoding scheme for re-encoding the interpreted application, wherein both the first string of characters and the second string are solely in the comment section of the application file and not in a mainline code section of the application file; and
    output a re-encoded application file that is executable by the processor of the target platform, the outputting based on the interpreted application file, wherein the processor re-encodes the application file using the second string, wherein outputting the warning message comprises outputting the warning message to an empty device such that the warning message is suppressed and not visible to a user.

7. The system of claim 6, wherein the string of characters in the comment section of the interpreted application file comprises one or more of an American Standard Code for Information Interchange (ASCII) encoding scheme and a Unicode encoding scheme.

8. The system of claim 6, wherein re-encoded application file comprises a mainline code section re-encoded to an Extended Binary Coded Decimal Interchange Code (EBCDIC) encoding scheme.

9. The system of claim 6, wherein the second string of characters comprises instructions for re-encoding that, when executed by a second processor running a second platform operating system dissimilar to the target platform, are ignored by the second platform operating system.

10. The system of claim 6, wherein the outputting the warning message indicative that the non-native encoding exists in the interpreted application file is optionally output.

11. A computer program product for re-encoding an interpreted application file, the computer program product comprising:
  a storage medium readable by a processing circuit and storing instructions for execution by the processing circuit for performing a method comprising:
    parsing, via processor, a string of characters in a comment section of the interpreted application file;
    responsive to determining that at least one character of the string of characters is not readable by a target platform, re-encoding, via the processor, the interpreted application file using the string of characters in the comment section, the re-encoding comprising:
      parsing, via the processor, a first character in the string of characters;
      outputting, via the processor, a warning message indicative that a non-native encoding exists in the interpreted application file;
      parsing, via the processor, a second character sequential to the first character, wherein the second character is a first element in a second string of characters indicative of a re-encoding scheme for re-encoding the interpreted application, wherein both the first string of characters and the second string are solely in the comment section of the application file and not in a mainline code section of the application file; and
      outputting, via the processor, a re-encoded application file that is executable by the target platform, the outputting based on the interpreted application file, wherein the processor re-encodes the application file using the second string, wherein outputting the warning message comprises outputting the warning message to an empty device such that the warning message is suppressed and not visible to a user.

12. The computer program product of claim 11, wherein the string of characters in the comment section of the interpreted application file comprises one or more of an American Standard Code for Information Interchange (ASCII) encoding scheme and a Unicode encoding scheme.

13. The computer program product of claim 11, wherein re-encoded application file comprises a mainline code section re-encoded to an Extended Binary Coded Decimal Interchange Code (EBCDIC) encoding scheme.

14. The computer program product of claim 11, wherein the second string of characters comprises instructions for re-encoding that, when executed by a second processor running a second platform operating system dissimilar to the target platform, are ignored by the second platform operating system.

* * * * *